(12) United States Patent
Kang et al.

(10) Patent No.: US 8,347,860 B2
(45) Date of Patent: Jan. 8, 2013

(54) CONTROL STRATEGY FOR A HOMOGENEOUS-CHARGE COMPRESSION-IGNITION ENGINE

(75) Inventors: Jun-Mo Kang, Ann Arbor, MI (US); Hanho Yun, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 799 days.

(21) Appl. No.: 12/551,608

(22) Filed: Sep. 1, 2009

(65) Prior Publication Data

US 2010/0037858 A1  Feb. 18, 2010

Related U.S. Application Data

(63) Continuation-in-part of application No. 12/369,086, filed on Feb. 11, 2009, now Pat. No. 8,186,329.

(60) Provisional application No. 61/029,038, filed on Feb. 15, 2008.

(51) Int. Cl.
  *F02P 5/00* (2006.01)
  *F02B 5/02* (2006.01)
  *F02D 13/02* (2006.01)
  *F02D 41/00* (2006.01)

(52) U.S. Cl. .................. 123/406.19; 701/103; 123/305; 123/406.23

(58) Field of Classification Search ............. 123/406.19, 123/406.23, 406.26, 305, 90.15, 575, 577, 123/299, 300; 701/103–105, 110
See application file for complete search history.

(56) References Cited

U.S. PATENT DOCUMENTS 7,894,976 B2 * 2/2011 Yun et al. ...................... 701/110
8,186,329 B2 * 5/2012 Wermuth et al. ........ 123/406.19

OTHER PUBLICATIONS

Krstic, Miroslav, Chapter 8 Extremum Systems, Stabilization of Nonlinear Uncertain Systems; pp. 163-167; Springer Verlag Publishers;1998.
U.S. Appl. No. 12/369,086, filed Feb. 11, 2009, Wermuth, et al.

* cited by examiner

*Primary Examiner* — Hieu T Vo

(57) ABSTRACT

A method for operating a multi-cylinder spark-ignition direct-injection internal combustion engine responsive to a low load demand includes monitoring an engine state associated with combustion for each cylinder during each combustion cycle during low load operation, determining a combustion stability index for each cylinder based upon the monitored engine state associated with combustion for the respective cylinder, and individually adjusting an initiation of a spark discharge relative to an end of a fuel injection event for each cylinder based upon the combustion stability index determined for the respective cylinder.

11 Claims, 4 Drawing Sheets

CONTROL STRATEGY FOR A HOMOGENEOUS-CHARGE COMPRESSION-IGNITION ENGINE

CROSS REFERENCE TO RELATED APPLICATIONS

This application is a continuation-in-part of application Ser. No. 12/369,086, filed Feb. 11, 2009, which claims the benefit of U.S. Provisional Application No. 61/029,038, filed Feb. 15, 2008, which are hereby incorporated herein by reference.

TECHNICAL FIELD

This disclosure relates to operation and control of homogeneous-charge compression-ignition (HCCI) engines.

BACKGROUND

The statements in this section merely provide background information related to the present disclosure and may not constitute prior art.

Known spark-ignition (SI) engines introduce an air/fuel mixture into each cylinder which is compressed in a compression stroke and ignited by a spark plug. Known compression ignition engines inject pressurized fuel into a combustion cylinder near top dead center (TDC) of the compression stroke which ignites upon injection. Combustion for both gasoline engines and diesel engines involves premixed or diffusion flames controlled by fluid mechanics.

SI engines can operate in a variety of different combustion modes, including a homogeneous-charge SI combustion mode and a stratified-charge SI combustion mode. SI engines can be configured to operate in a homogeneous-charge compression-ignition (HCCI) combustion mode, also referred to interchangeably as controlled auto-ignition (HCCI) combustion, under predetermined speed/load operating conditions. The controlled auto-ignition (HCCI) combustion is a distributed, flameless, auto-ignition combustion process that is controlled by oxidation chemistry. An engine operating in the controlled auto-ignition (HCCI) combustion mode has a cylinder charge that is preferably homogeneous in composition, temperature, and residual exhaust gases at intake valve closing time. Controlled auto-ignition (HCCI) combustion is a distributed kinetically-controlled combustion process with the engine operating at a dilute air/fuel mixture, i.e., lean of an air/fuel stoichiometric point, with relatively low peak combustion temperatures, resulting in low nitrous oxides (NOx) emissions. The homogeneous air/fuel mixture minimizes occurrences of rich zones that form smoke and particulate emissions.

Controlled auto-ignition (HCCI) combustion depends strongly on factors such as cylinder charge composition, temperature, and pressure at intake valve closing. Hence, the control inputs to the engine must be carefully coordinated to ensure auto-ignition combustion. Controlled auto-ignition (HCCI) combustion strategies may include using an exhaust recompression valve strategy. The exhaust recompression valve strategy includes controlling a cylinder charge temperature by trapping hot residual gas from a previous engine cycle by adjusting valve close timing. In the exhaust recompression strategy, the exhaust valve closes before top-dead-center (TDC) and the intake valve opens after TDC creating a negative valve overlap (NVO) period in which both the exhaust and intake valves are closed, thereby trapping the exhaust gas. The opening timings of the intake and exhaust valves are preferably symmetrical relative to TDC intake. Both a cylinder charge composition and temperature are strongly affected by the exhaust valve closing timing. In particular, more hot residual gas from a previous cycle can be retained with earlier closing of the exhaust valve leaving less room for incoming fresh air mass, thereby increasing cylinder charge temperature and decreasing cylinder oxygen concentration. In the exhaust recompression strategy, the exhaust valve closing timing and the intake valve opening timing are measured by the NVO period.

In engine operation, the engine airflow is controlled by selectively adjusting position of an intake air throttle valve and adjusting opening and closing of intake valves and exhaust valves. In one known system, opening and closing of the intake valves and exhaust valves can be accomplished using a variable valve actuation system that includes variable cam phasing and a selectable multi-step valve lift, e.g., multiple-step cam lobes which provide two or more valve lift positions. The change in valve position of the multi-step valve lift mechanism can be a discrete change. In other known systems, the change in valve position can be continuously variable.

When an engine operates in a controlled auto-ignition (HCCI) combustion mode, the engine control includes lean or stoichiometric air/fuel ratio operation with the throttle wide open to minimize engine pumping losses. When the engine operates in the SI combustion mode, the engine control operates at a stoichiometric air/fuel ratio, with the throttle valve controlled over a range of positions from 0% to 100% of the wide-open position to control intake airflow to achieve the stoichiometric air/fuel ratio.

Engine speed/load operating ranges over which an engine can operate in a controlled auto-ignition (HCCI) combustion mode can be limited due to issues related to incomplete combustion and combustion stability. Known engine systems may limit or prohibit engine operation in the controlled auto-ignition (HCCI) combustion mode at low speed/low load operating conditions including closed throttle/idle conditions and cold engine operation to minimize incomplete combustion and combustion instability.

SUMMARY

A method for operating a multi-cylinder spark-ignition direct-injection internal combustion engine responsive to a low load demand includes monitoring an engine state associated with combustion for each cylinder during each combustion cycle during low load operation, determining a combustion stability index for each cylinder based upon the monitored engine state associated with combustion for the respective cylinder, and individually adjusting an initiation of a spark discharge relative to an end of a fuel injection event for each cylinder based upon the combustion stability index determined for the respective cylinder.

BRIEF DESCRIPTION OF THE DRAWINGS

One or more embodiments will now be described, by way of example, with reference to the accompanying drawings, in which.

DETAILED DESCRIPTION

Figure 1:
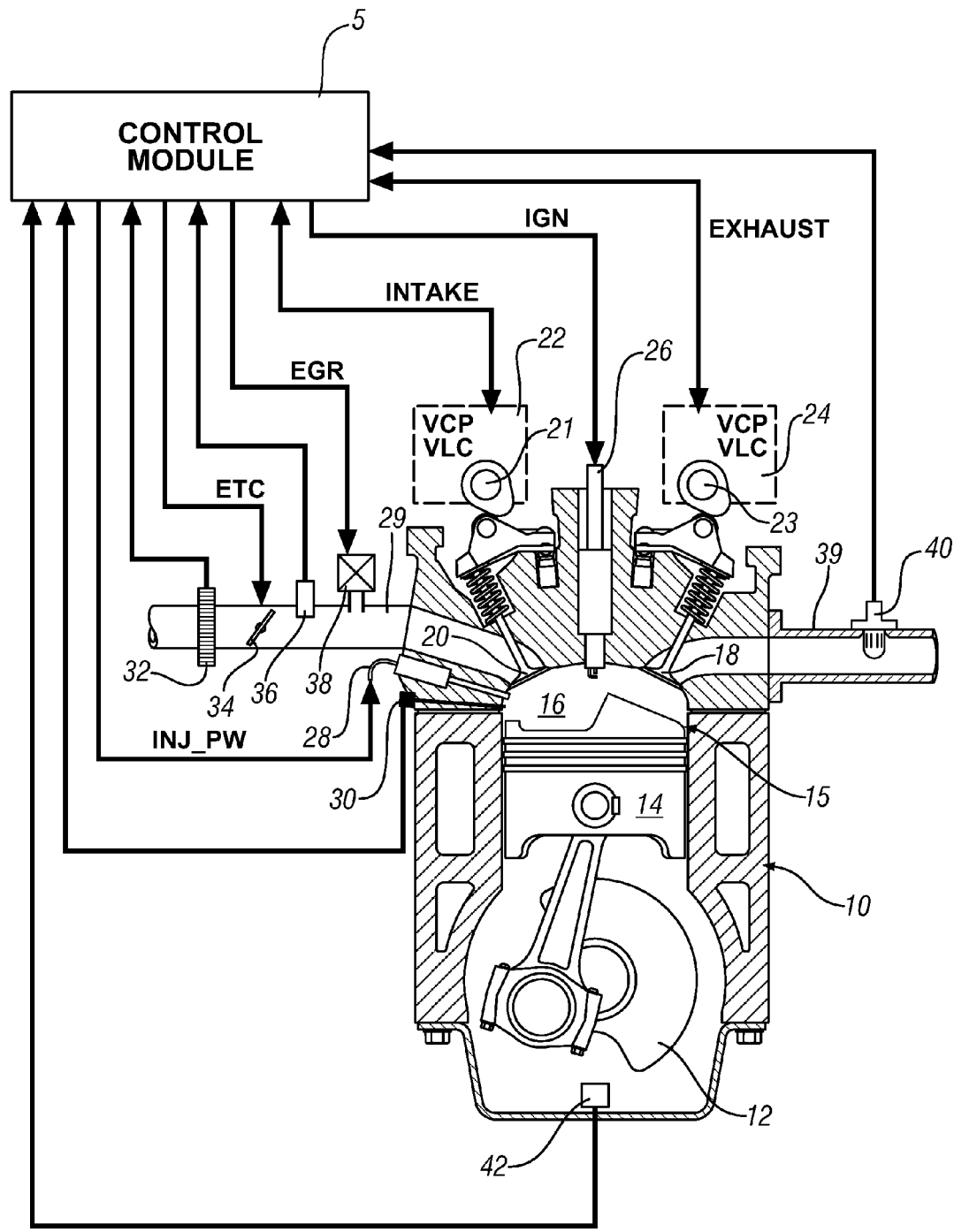
FIG. 1 is a schematic drawing of an exemplary engine system in accordance with the present disclosure.

Referring now to the drawings, wherein the showings are for the purpose of illustrating certain exemplary embodiments only and not for the purpose of limiting the same, FIG. 1 schematically illustrates an internal combustion engine 10 and accompanying control module 5 that have been constructed in accordance with an embodiment of the disclosure. The exemplary engine 10 is a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating piston travel is translated to rotational motion. A single one of the cylinders 15 is shown in FIG. 1.

An air intake system channels intake air to an intake manifold 29 which directs and distributes the air into an intake passage to each combustion chamber 16. The air intake system includes air flow ductwork and devices for monitoring and controlling the air flow. The devices preferably include a mass air flow sensor 32 for monitoring mass air flow and intake air temperature. A throttle valve 34, preferably including an electronically controlled device, controls air flow to the engine 10 in response to a control signal (ETC) from the control module 5. A manifold pressure sensor 36 monitors manifold absolute pressure and barometric pressure in the intake manifold 29. An external flow passage having a flow control valve referred to as an exhaust gas recirculation (EGR) valve 38 recirculates residual exhaust gases from an exhaust manifold 39 to the intake manifold 29. The control module 5 preferably controls mass flow of recirculated exhaust gas to the intake manifold 29 by controlling magnitude of opening of the EGR valve 38.

Air flow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with a system to control openings and closings of the intake and exhaust valves 20 and 18. In one embodiment, the openings and closings of the intake and exhaust valves 20 and 18 can be controlled with an intake camshaft 21 and an exhaust camshaft 23 that are operatively connected to intake and exhaust variable cam phasing/variable lift control (VCP/VLC) devices 22 and 24 respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a controllable mechanism operative to variably control valve lift (VLC) and variably control cam phasing (VCP) of the intake valve(s) 20 for each cylinder 15 in response to a control signal (INTAKE) from the control module 5. The exhaust VCP/VLC device 24 preferably includes a controllable mechanism operative to variably control valve lift (VLC) and variably control phasing (VCP) of the exhaust valve(s) 18 for each cylinder 15 in response to a control signal (EXHAUST) from the control module 5. The VCP/VLC devices 22 and 24 each preferably include a controllable two-step valve lift mechanism operative to control magnitude of valve lift, or opening, of the intake and exhaust valve(s) 20 and 18 to one of two discrete steps. The two discrete steps preferably include a low-lift valve open position (about 4-6 mm in one embodiment) for load speed, low load operation, and a high-lift valve open position (about 8-13 mm in one embodiment) for high speed and high load operation. The VCP/VLC devices 22 and 24 preferably include variable cam phasing mechanisms to control phasing (i.e., relative timing) of opening and closing of the intake valve(s) 20 and the exhaust valve(s) 18, respectively. The phasing refers to shifting opening times of the intake and exhaust valve(s) 20 and 18 relative to positions of the crankshaft 12 and the piston 14 in the respective cylinder 15. The variable cam phasing systems of the VCP/VLC devices 22 and 24 preferably have a range of phasing authority of about 60°-90° of crank rotation, thus permitting the control module 5 to advance or retard opening and closing of one of intake and exhaust valve(s) 20 and 18 relative to position of the pistons 14 for each cylinder 15. The range of phasing authority is defined and limited by the VCP/VLC devices 22 and 24. The VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, controlled by the control module 5.

The engine 10 includes a fuel injection system, including a plurality of high-pressure fuel injectors 28 each adapted to directly inject a mass of fuel into the combustion chamber 16, in response to a control signal (INJ_PW) from the control module 5. As used herein, fueling refers to a mass fuel flow into one of the combustion chambers 16. The fuel injectors 28 are supplied pressurized fuel from a fuel distribution system.

The engine 10 includes a spark ignition system including a spark plug 26 that provides a spark discharge to ignite or assist in igniting cylinder charges in each combustion chamber 16 in response to a control signal (IGN) from the control module 5. The spark plug 26 enhances control of combustion timing in each cylinder 15 of the engine 10 at certain conditions, e.g., during cold start and near a low load operation limit.

The engine 10 is equipped with various sensing devices for monitoring engine operation, including a crank sensor 42 configured to monitor crankshaft rotational position, i.e., crank angle and speed, a wide range air/fuel ratio sensor 40 configured to monitor air/fuel ratio in the exhaust gas feedstream, and a combustion sensor 30 adapted to monitor in-cylinder combustion in real-time during ongoing operation of the engine 10. The combustion sensor 30 is a device operative to monitor a state of a combustion parameter and is depicted as a cylinder pressure sensor operative to monitor in-cylinder combustion pressure. The control module 5 determines engine states associated with the monitored signals output from the combustion sensor 30 and the crank sensor 42. Engine states preferably include combustion phasing, i.e., timing of combustion pressure relative to the crank angle of the crankshaft 12 for each cylinder 15 for each combustion cycle. One engine state associated with combustion phasing can be determined based upon the timing of the combustion pressure relative to the crank angle of the crankshaft 12 for one of the cylinders 15 for each combustion cycle and includes an engine crank angle associated with a 50% fuel-burn point, designated as CA50. The signal output from the combustion sensor 30 can also be monitored by the control module 5 to determine a mean-effective-pressure (IMEP) for each cylinder 15 for each combustion cycle, from which a parameter indicative of combustion stability, or alternatively combustion variation can be determined for each cylinder. An index of combustion stability or combustion variation is a coefficient of variation of cylinder pressure (COV of IMEP). An alternative index of combustion stability or combustion variation is a standard deviation of IMEP (Stdv. of IMEP). Alternatively, other sensing systems can be used to monitor real-time in-cylinder combustion parameters that can be translated into combustion phasing and combustion stability, e.g., ion-sense ignition systems and non-intrusive cylinder pressure monitoring systems.

Widely available grades of gasoline and light ethanol blends thereof are preferred fuels; however, alternative liquid and gaseous fuels such as higher ethanol blends (e.g. E80, E85), neat ethanol (E99), neat methanol (M100), natural gas, hydrogen, biogas, various reformates, syngases, and others may be used in the implementation of the present disclosure.

The control module 5 is preferably a general-purpose digital computer including a microprocessor or central processing unit, storage mediums including non-volatile memory including read only memory and electrically programmable read only memory, random access memory, a high speed clock, analog to digital and digital to analog circuitry, and input/output circuitry and devices and appropriate signal conditioning and buffer circuitry. The control module 5 has a set of control algorithms, including resident program instructions and calibrations stored in the non-volatile memory and executed to provide the desired functions. The algorithms are preferably executed during preset loop cycles. Algorithms are executed by the central processing unit and are operable to monitor inputs from the aforementioned sensing devices and execute control and diagnostic routines to control operation of the actuators, using preset calibrations. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Figure 2:
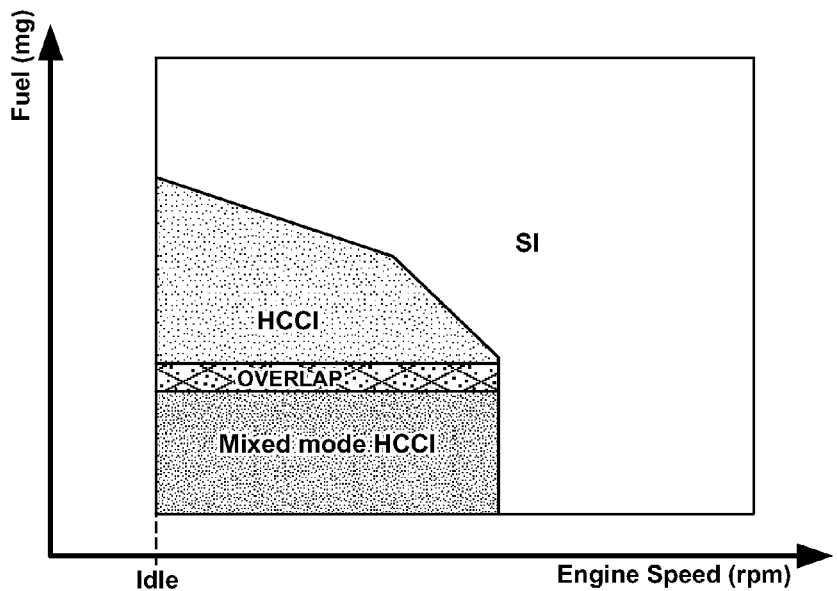
FIG. 2 graphically illustrates exemplary speed and load operating zones for various combustion modes in accordance with the present disclosure.

FIG. 2 graphically shows preferred combustion modes for operating the engine 10 based upon an engine operating point, depicted over a range of engine speeds (rpm) and loads represented in this embodiment by fuel (mg). The engine 10 operates in one of a spark-ignition (SI) combustion mode, a controlled auto-ignition (HCCI) combustion mode, and a mixed (Mixed mode HCCI) combustion mode corresponding to an engine speed/load operating point. There can be overlap in operating ranges for the controlled auto-ignition (HCCI) combustion mode and the mixed (Mixed mode HCCI) combustion mode (OVERLAP). Each of the combustion modes is associated with a preferred speed and load operating range. The preferred speed and load operating range for each combustion mode can be determined based upon engine operating parameters including combustion stability, fuel consumption, emissions, engine torque output, and others. Boundaries which define the preferred speed and load operating ranges to delineate operation in the aforementioned combustion modes are preferably precalibrated and stored in the control module 5.

The engine 10 is controlled to operate at a preferred air/fuel ratio to achieve preferred performance associated with one or more of the engine operating parameters including combustion stability, fuel consumption, emissions, and engine torque output, with the intake air flow controlled to achieve the preferred air/fuel ratio. This includes estimating a cylinder air charge based upon engine operation in the selected combustion mode. The throttle valve 34 and the VCP/VLC devices 22 and 24 are controlled to achieve an intake air flowrate based upon the estimated cylinder air charge, including during transitions between the combustion modes. Air flow is controlled by adjusting the throttle valve 34 and controlling the VCP/VLC devices 22 and 24 to control the opening timing and profiles of the intake and exhaust valve(s) 20 and 18. Operation in each of the combustion modes can require different settings for the VCP/VLC devices 22 and 24 in terms of valve lift, duration and phasing of the intake and exhaust valve(s) 20 and 18 and opening angle of the throttle valve 34.

The controlled auto-ignition (HCCI) combustion mode includes operating the engine 10 with the throttle valve 34 substantially wide-open with the fueling to the engine 10 controlled to achieve a lean air/fuel ratio and sufficient to meet an output torque request. The VCP/VLC devices 22 and 24 are preferably controlled at the low-lift valve open position and at a phasing that achieves a negative valve overlap (NVO) period of a predetermined duration between closing of the exhaust valve(s) 18 and opening of the intake valve(s) 20 causing a recompression period. During the recompression period a high proportion of high temperature residual combustion products are retained from a previous combustion cycle and provide conditions for auto-ignition of the combustion charge in a highly diluted mixture. Preferably there is a single fuel injection event, timed to occur during the intake stroke and early in the compression stroke.

The spark-ignition (SI) combustion mode includes operating the engine 10 with the throttle valve 34 controlled to regulate the intake air flow with the fueling to the engine 10 controlled to achieve a stoichiometric air/fuel ratio and sufficient to meet an output torque request. The VCP/VLC devices 22 and 24 are preferably controlled at the high-lift valve open position and at phasings that achieve a positive valve overlap between closing of the exhaust valve(s) 18 and opening of the intake valve(s) 20 to retain a small portion of residual combustion products from a previous combustion cycle in the spark-ignition (SI) combustion mode. The engine 10 operates in the spark-ignition (SI) combustion mode with a controlled throttle operation under conditions not conducive to the controlled auto-ignition (HCCI) combustion mode operation, and to achieve engine power to meet the output torque request.

The mixed (Mixed mode HCCI) combustion mode includes operating the engine 10 with the throttle valve 34 wide-open. The VCP/VLC devices 22 and 24 are preferably controlled at the low-lift valve open position and at phasings that achieves a negative valve overlap (NVO) period of a predetermined duration between closing of the exhaust valve (s) 18 and opening of the intake valve(s) 20 resulting in an exhaust recompression period analogous to that described with reference to the controlled auto-ignition (HCCI) combustion mode. The mixed (Mixed mode HCCI) combustion mode preferably includes multiple fuel injection events per cylinder for each combustion cycle and multiple spark events during or immediately subsequent to one or two of the fuel injection events. This includes dividing the total required fuel mass per cycle into at least three fuel injection events.

Figure 3:
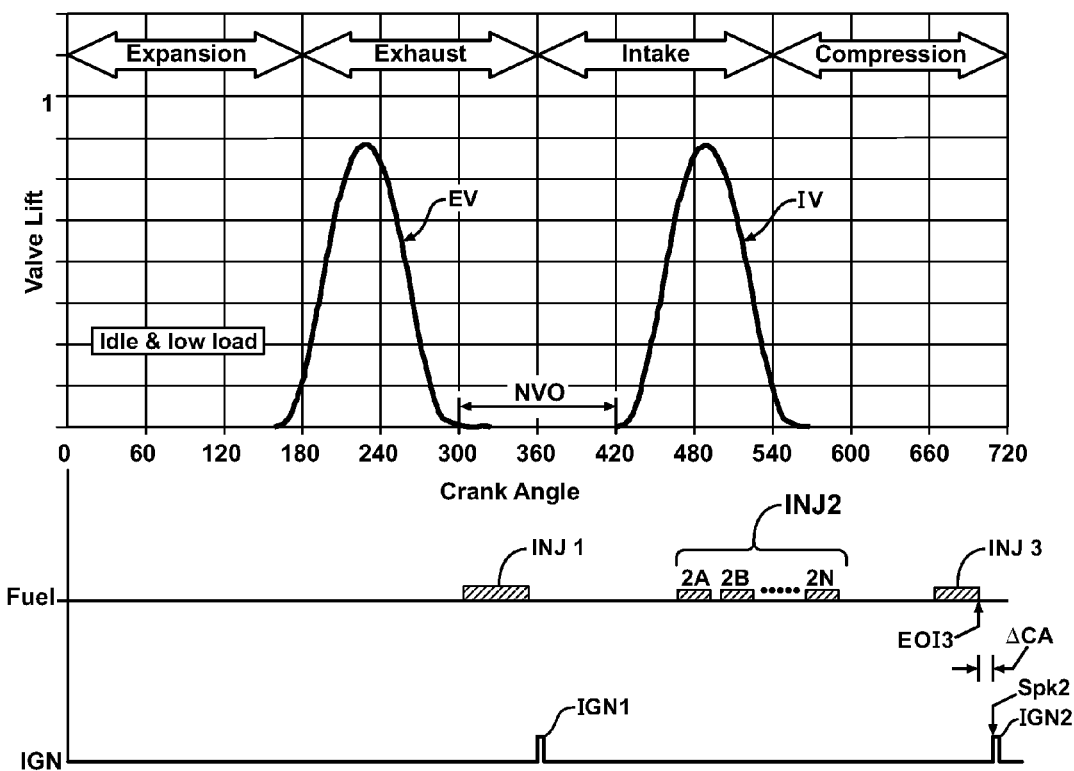
FIG. 3 graphically illustrates actuator commands and corresponding states of engine parameters in accordance with the present disclosure.

FIG. 3 graphically depicts operation of an exemplary engine 10 in the mixed (Mixed mode HCCI) combustion mode, plotted as a function of engine crank angle for one of the cylinders. Repetitively occurring combustion cycles of Expansion, Exhaust, Intake and Compression are depicted. Openings and closings of the exhaust valve 18 (EV) and the intake valve 20 (IV) are depicted, and include the negative valve overlap period (NVO) resulting in the exhaust recompression period.

A first fuel injection event (INJ1) preferably occurs during the exhaust recompression period, as shown. A corresponding first spark discharge (IGN1) is initiated immediately subsequent to the end of the first fuel injection event to effect fuel reforming.

A second fuel injection event (INJ2) preferably occurs during the end of the intake stroke and at the beginning of the compression stroke. The second fuel injection event includes the main fuel mass portion of the total required fuel mass per cycle to achieve a desired engine work output. The second fuel injection event can include a single fuel injection event or a plurality of fuel injection events, as shown.

A third fuel injection event (INJ3) preferably occurs late in the compression stroke, as shown. A corresponding second spark discharge (IGN2) is initiated immediately subsequent to the end of the third fuel injection event to effect a flame propagation fuel injection event to achieve spray-guided combustion, i.e., to improve in-cylinder conditions for auto-ignition of the main fuel mass portion injected during the second fuel injection event.

An end point of the third fuel injection event (EOI3) and an initiation point of the second spark discharge (Spk2) are depicted. There is preferably a delay period ($\Delta CA$) measured in elapsed crank-angle degrees between the end point of the third fuel injection event (EOI3) and the initiation point of the second spark discharge (Spk2). Preferably, the mass of injected fuel during each of the first and third fuel injection events is a minimum fuel mass sufficient to achieve the purposes described herein. Preferably there is no spark discharge associated with the second fuel injection event during operation in the mixed (Mixed mode HCCI) combustion mode.

The multiple fuel injection events enable a split fuel injection strategy, wherein the first injection event causes a first portion of the total required fuel mass per cycle to be injected during the exhaust recompression period when the intake and exhaust valves 20 and 18 are both closed and gas temperatures and cylinder pressures are high. The injected fuel goes through partial oxidation, i.e., a reforming reaction, to produce extra heat for controlled auto-ignition (HCCI) that occurs in the power stroke. The low engine load conditions that lead to lower in-cylinder temperatures and fuel reforming during the exhaust recompression period may not be sufficient to trigger auto-ignition of the combustion charge. In this operating range, i.e., at and near engine idle operation, the third injection event injects a mass of fuel late in the compression stroke of the combustion cycle, referred to as a flame propagation fuel injection event. The flame propagation fuel injection event is a stratified, spray-guided fuel injection event in the combustion chamber 16 that is ignited by the second spark discharge (IGN2), thus propagating a combustion wave that compresses the remaining fuel-air mixture in the combustion chamber 16 to effect auto-ignition of the combustion charge therein. The fuel mass burned during reforming corresponds closely with the combustion stability (COV of IMEP) and NOx emissions. It has been found that the NOx emissions decrease and combustion stability (COV of IMEP) increases with increased mass of reformed fuel during the recompression period.

Figure 4:
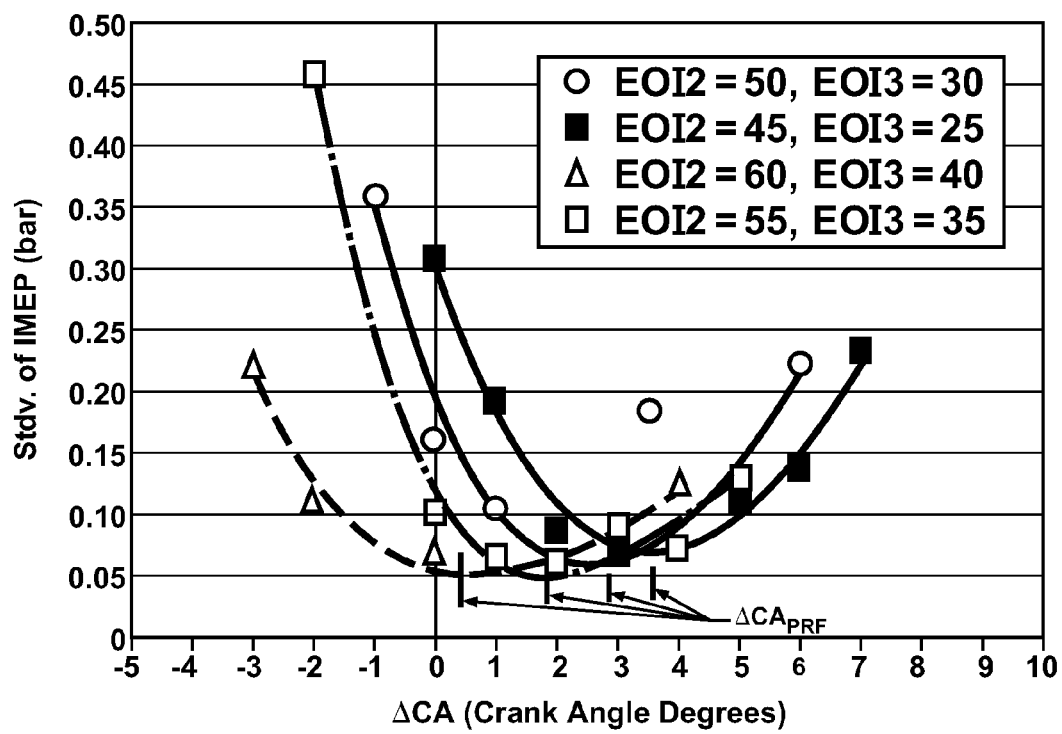
FIGS. 4 and 5 are datagraphs illustrating engine operation in accordance with the present disclosure.

FIG. 4 graphically illustrates combustion stability (Stdv. of IMEP (bar)) as a function of a delay period ($\Delta CA$) between the end point of the third fuel injection event (EOI3) and the initiation point of the second spark discharge (Spk2) in crank-angle degrees before TDC for an individual cylinder of an exemplary engine constructed in accordance with the system described herein. The results depict several engine operating conditions including timing of end points of second and third fuel injection events (EOI2 and EOI3). The timings of the fuel injection and the spark discharge that occur in the compression stroke are adjusted to achieve the desired combustion stability and the timings of the fuel injection and spark discharge during the NVO period are adjusted for the desired amount of fuel reforming. The remainder of the fuel that is needed to reach a desired engine work output can be introduced during the second fuel injection event (INJ2) including one or more injection pulses during the intake stroke or early in the compression stroke to achieve the best fuel efficiency.

The results indicate that combustion stability is affected by the delay period ($\Delta CA$) between the end point of the third fuel injection event (EOI3) and the initiation point of the second spark discharge (Spk2). These results indicate that there are preferred delay periods ($\Delta CA_{PRF}$) including delay periods that achieve a minimum combustion stability (COV of IMEP) that are associated with the engine operating conditions. A person having ordinary skill in the art understands that the preferred delay period ($\Delta CA_{PRF}$) can be affected by the engine operating conditions, combustion chamber design factors related to orientation of the fuel injector 28 relative to the spark plug 26, and uncontrollable in-use factors associated with aging and fuel properties. The in-use factors include, e.g., fuel composition, injector characteristics including aging, thermal history or combustion chamber deposits that affect the auto-ignition and flame propagation process.

Figure 5:
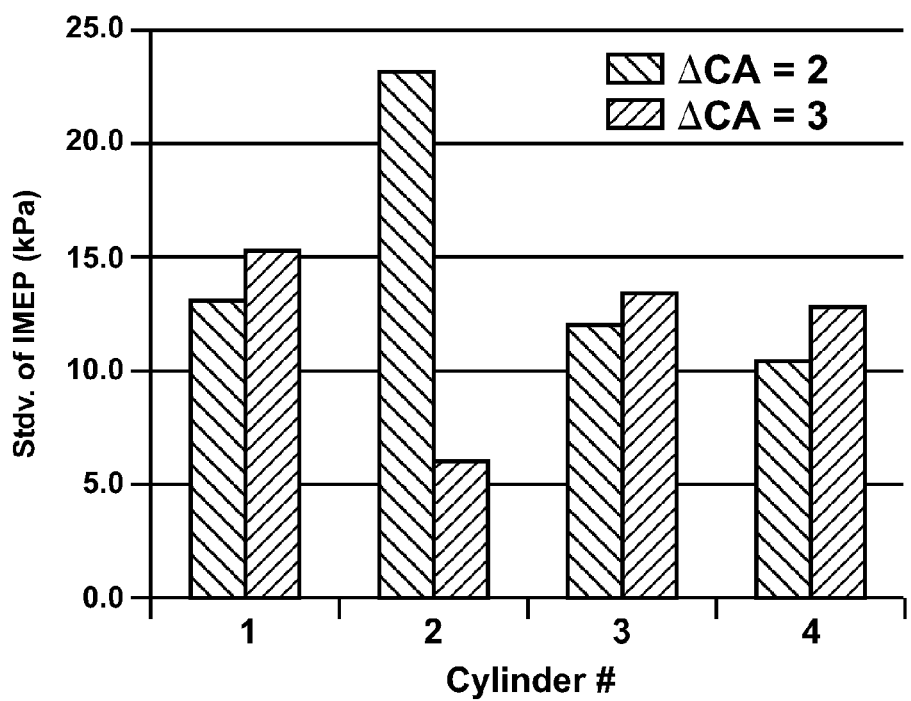

FIG. 5 shows experimental results of combustion stability (Stdv of IMEP (kPa)) associated with individual engine cylinders (Cylinder #) that are associated with operating an exemplary multi-cylinder engine using a fixed calibration for a delay period ($\Delta CA$) for cylinders 1, 2, 3, and 4. The results depict combustion stability (Stdv of IMEP (kPa)) for a delay period of two crank-angle degrees ($\Delta CA=2$) between the end point of the third fuel injection event (EOI3) and the initiation point of the second spark discharge (Spk2) and a delay period of three crank-angle degrees ($\Delta CA=3$) between the end point of the third fuel injection event (EOI3) and the initiation point of the second spark discharge (Spk2). The specific results include controlling the delay period ($\Delta CA$) when operating at engine conditions of 800 rpm with 5 mg fuel mass injected in an exemplary four-cylinder engine configured to operate in the mixed mode combustion mode. The results indicate that cylinder #2 has substantially poorer combustion stability (Stdv of IMEP (kPa)) than the other three cylinders at a delay period of two crank-angle degrees ($\Delta CA=2$). At a delay period of three crank-angle degrees ($\Delta CA=3$), combustion stability of cylinder #2 substantially improves while the combustion stability of the other three cylinders slightly deteriorates when compared with operating with the delay period of two crank-angle degrees ($\Delta CA=2$). Thus, the preferred delay period can be cylinder-specific within an engine with each individual cylinder j having an associated preferred delay period $\Delta CA_{PRF}(j)$.

Figure 6:
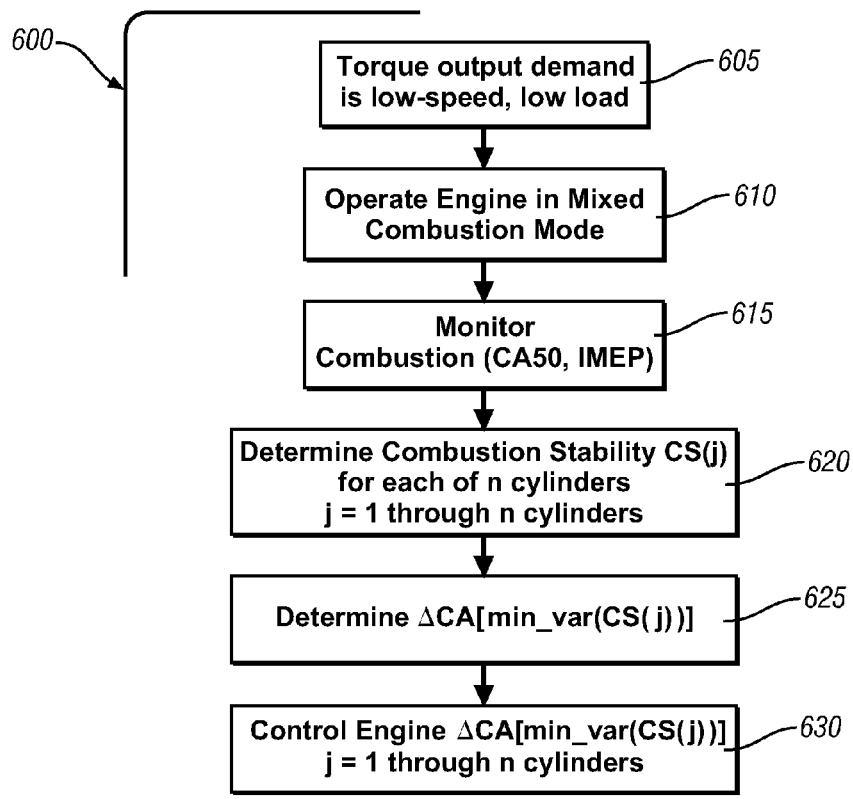
FIGS. 6 and 7 schematically illustrate engine operating control schemes in accordance with the present disclosure.
Figure 7:
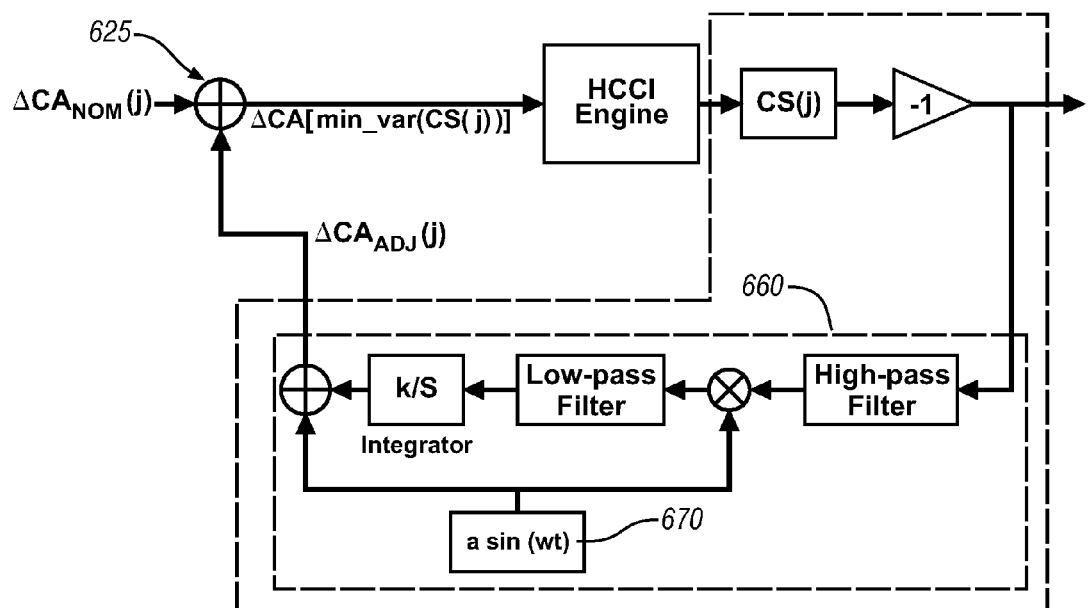

FIGS. 6 and 7 show elements of a control scheme 600 for determining and maintaining operation at the preferred delay period $\Delta CA_{PRF}(j)$ for each of the n individual cylinders of a multi-cylinder engine 10 as described herein. The control scheme 600 is described with reference to an operating condition including a low-speed, low-load engine operation in the mixed combustion mode that is responsive to a low demand for torque output (605, 610). Combustion is monitored as described herein, including determining combustion phasing (CA50) and mean-effective-pressure (IMEP) for each cylinder j (j=1 through n) for each combustion cycle in one embodiment (615). A combustion stability index CS(j) can be determined for each of the cylinders j. The combustion stability index CS(j) is an arithmetic average of combustion phasing (CA50) in one embodiment, or alternatively is a coefficient of variation of the cylinder pressure (COV of IMEP) (620).

A delay period $\Delta CA[min\_var(CS(j))]$ between the end point of the third fuel injection event (EOI3) and the initiation of the (Spk2) that achieves a minimum variation in the combustion stability for each cylinder j is determined, and is preferably associated with the combustion stability index CS(j) for each cylinder j (625). The delay period ΔCA[min_var(CS(j))] is preferably determined using a feedback control scheme. An exemplary feedback control scheme is described with reference to FIG. 7.

The combustion stability during operation of the engine 10 in the mixed (Mixed mode HCCI) combustion mode is associated with combustion timing, i.e., late combustion timing results in poor combustion stability and combustion stability improves as combustion timing advances. The control scheme 600 determines an optimal spark timing that achieves the most advanced combustion timing for each cylinder in real-time with low combustion stability. The preferred delay period for controlling engine operation for cylinder j is the delay period that achieves the minimum variation in the combustion stability for cylinder j, i.e., ΔCA[min_var(CS(j))] (630).

FIG. 7 schematically shows details of an exemplary feedback control scheme 625 for a single cylinder j of a multi-cylinder engine configured to operate in controlled auto-ignition (HCCI) combustion and mixed (Mixed mode HCCI) combustion modes, in accordance with the engine 10 described herein. It should be understood that there is a plurality of feedback control schemes 625, each which is executed for one of the cylinders j (j=1 through n) of the exemplary multi-cylinder engine 10. Each feedback control scheme 625 is executed to determine the delay period ΔCA[min_var(CS(j))] between the end point of the third fuel injection event (EOI3) and the initiation point of the second spark discharge (Spk2) to achieve minimum variation in the combustion stability for each cylinder j and is associated with the combustion stability index CS(j) for the cylinder j. The feedback control scheme 625 is depicted as including discrete elements for ease of description. It should be recognized that the functions performed by these elements may be combined in one or more devices, e.g., implemented in software, hardware, and/or application-specific integrated circuitry, including one or more algorithms executed in the control module 5.

The feedback control scheme 625 includes an extremum-seeking or self-stabilizing control algorithm 650 for each individual cylinder j that is executed to identify a preferred separation, i.e., delay period ΔCA[min_var(CS(j))] between the end point of the third fuel injection event (EOI3) and the initiation point of the second spark discharge (Spk2) for the individual cylinder j. The self-stabilizing control algorithm 650 intentionally periodically disturbs combustion by changing the initiation point of the second spark discharge (Spk2) and monitoring the associated combustion stability index CS(j), i.e., combustion phasing CA50 in one embodiment. Based on the gradient obtained when the combustion is disturbed, the self-stabilizing control algorithm 650 slowly adjusts the initiation point of the second spark discharge (Spk2) until the combustion stability index CS(j) for cylinder j reaches a local minimum value, e.g., $\Delta CA_{PRF}$ shown with reference to FIG. 4. Since cyclic variation has been shown to decrease as combustion phasing CA50 advances in exemplary HCCI engines, a combustion stability index CS(j) consisting of an averaged value for the combustion phasing CA50 over a plurality of combustion cycles can be a reliable indicator of cyclic variation. Thus, when the average value for combustion phasing CA50 reaches a minimum value, cyclic variation in combustion is also minimized, thereby improving the combustion stability for the selected individual cylinder j.

There is a nominal delay period $\Delta CA_{NOM}(j)$ that is preferably predetermined and having the same state or value for each of the cylinders. The nominal delay period $\Delta CA_{NOM}(j)$ is individually adjusted by a cylinder-specific adjusted delay period $\Delta CA_{ADJ}(j)$ that has been determined to achieve the preferred delay period ΔCA[min_var(CS(j))] for cylinder j using the self-stabilizing control algorithm 650 and the engine 10 is controlled thereby.

The self-stabilizing control algorithm 650 monitors engine operation, e.g., combustion phasing (CA50) for each cylinder j and calculates an associated combustion stability index CS(j) therefrom. The combustion stability index CS(j) is inverted (−1) and is input to a feedback control loop including a signal processing algorithm 660.

The signal processing algorithm 660 includes a periodic function generator (a sin(wt)) 670 that slowly and periodically introduces a disturbance in the spark discharge timing. The combustion stability index CS(j) is subjected to a high-pass filter, the output of which is combined with the periodic function generator (a sin(wt)) 670, preferably using a multiplicative function. The signal output of the multiplicative function is subjected to a low pass filter and an integrator function (k/S), and then recombined or separated from the periodic function generator (a sin(wt)) 670 using a summing function to determine the adjusted delay period $\Delta CA_{ADJ}(j)$, which is output from the self-stabilizing control algorithm 650 and combined with the nominal delay period $\Delta CA_{NOM}(j)$ to determine the preferred delay period ΔCA[min_var(CS(j))] for cylinder j for operating the engine 10 in the mixed (Mixed mode HCCI) combustion mode.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating a multi-cylinder spark-ignition direct-injection internal combustion engine responsive to a low load demand, comprising:
    monitoring an engine state associated with combustion for each cylinder during each combustion cycle during low load operation;
    determining a combustion stability index for each cylinder based upon the monitored engine state associated with combustion for the respective cylinder; and
    individually adjusting an initiation of a spark discharge relative to an end of a fuel injection event for each cylinder based upon the combustion stability index determined for the respective cylinder.

2. The method of claim 1, wherein individually adjusting initiation of a spark discharge relative to an end of a fuel injection event for each cylinder based upon the combustion stability index determined for the respective cylinder comprises:
    identifying a preferred initiation of spark discharge relative to the end of the fuel injection event that achieves a minimum combustion stability index for the respective cylinder.

3. The method of claim 2, wherein identifying the preferred initiation of spark discharge relative to the end of the fuel injection event that achieves the minimum combustion stability index for the respective cylinder comprises selectively adjusting the initiation of the spark discharge relative to the end of the fuel injection event for the cylinder from a nominal spark timing relative to the end of the fuel injection event.

4. The method of claim 3, wherein selectively adjusting the initiation of the spark discharge relative to the end of the fuel injection event comprises introducing a disturbance in the initiation of the spark discharge.

5. The method of claim 1, further comprising operating the multi-cylinder spark-ignition direct-injection internal combustion engine in a mixed-mode combustion mode.

6. Method for operating a multi-cylinder spark-ignition direct-injection internal combustion engine, comprising:
 operating the engine in a mixed combustion mode including executing respective first, second, and third fuel injection events in each cylinder during each combustion cycle;
 determining engine states associated with combustion for each cylinder during each combustion cycle;
 determining a combustion stability index for each cylinder based upon the engine state for the corresponding cylinder; and
 initiating a spark discharge subsequent to the respective third injection event in each cylinder during each combustion cycle that achieves a minimum state for the combustion stability index for the corresponding cylinder.

7. The method of claim 6, wherein initiating the spark discharge subsequent to the respective third injection event in each cylinder during each combustion cycle that achieves the minimum state for the combustion stability index for the corresponding cylinder comprises:
 adjusting initiating the spark discharge from a nominal spark timing relative to the respective third fuel injection event in each cylinder during low load operation.

8. The method of claim 7, wherein adjusting initiating the spark discharge from the nominal spark timing relative to the respective third fuel injection event in each cylinder during low load operation comprises introducing a disturbance in the initiation of the spark discharge.

9. Method for operating a multi-cylinder spark-ignition direct-injection internal combustion engine configured to control intake and exhaust valves at low loads, comprising:
 controlling the intake and exhaust valves to achieve a negative valve overlap period;
 executing a respective first fuel injection event and effecting a respective first spark discharge during a recompression phase of the negative valve overlap period for each cylinder;
 executing a respective second fuel injection event during an intake phase of the engine cycle for each cylinder;
 executing a respective third fuel injection event during a compression phase of the engine cycle for each cylinder;
 determining a respective combustion stability index for each cylinder;
 initiating a respective second spark discharge subsequent to an end of the respective third fuel injection event effective to minimize the respective combustion stability index for the corresponding cylinder.

10. The method of claim 9, wherein each respective combustion stability index is determined based upon one of a combustion phasing and a net-mean-effective-pressure for each corresponding cylinder.

11. The method of claim 9, wherein each respective combustion stability index is determined based upon an average combustion phasing for each corresponding cylinder over a plurality of combustion cycles.

* * * * *